US012750831B2

(12) United States Patent
Awadin et al.

(10) Patent No.: US 12,750,831 B2
(45) Date of Patent: Sep. 29, 2026

(54) DYNAMIC UPLINK AND DOWNLINK OPERATING SWITCHING IN WIRELESS COMMUNICATION SYSTEMS

(71) Applicant: Samsung Electronics Co., Ltd., Gyeonggi-do (KR)

(72) Inventors: Mohamed Awadin, San Diego, CA (US); Jung Hyun Bae, San Diego, CA (US); Yuan-sheng Cheng, San Diego, CA (US)

(73) Assignee: Samsung Electronics Co., Ltd (KR)

( * ) Notice: Subject to any disclaimer, the term of this patent is extended or adjusted under 35 U.S.C. 154(b) by 341 days.

(21) Appl. No.: 18/530,835

(22) Filed: Dec. 6, 2023

(65) Prior Publication Data

US 2024/0260018 A1 Aug. 1, 2024

Related U.S. Application Data

(60) Provisional application No. 63/442,223, filed on Jan. 31, 2023.

(51) Int. Cl.
*H04W 72/0453* (2023.01)
*H04W 28/26* (2009.01)
(Continued)

(52) U.S. Cl.
CPC ....... *H04W 72/0453* (2013.01); *H04W 28/26* (2013.01); *H04W 72/0457* (2023.01); *H04W 72/232* (2023.01)

(58) Field of Classification Search
CPC ............. H04W 72/0453; H04W 28/26; H04W 72/0457; H04W 72/232; H04W 72/23;
(Continued)

(56) References Cited

U.S. PATENT DOCUMENTS

2021/0400637 A1 12/2021 Abotabl et al.
2023/0163937 A1* 5/2023 Awadin .................. H04L 5/001 370/329

(Continued)

FOREIGN PATENT DOCUMENTS

CN 116488781 7/2023
WO WO 2022/221859 10/2022

(Continued)

OTHER PUBLICATIONS

Moderator (CATT), Summary #1 of subband non-overlapping full duplex, 3GPP TSG RAN WG1 #110bis-e, R1-22xxxxx (Year: 2022).*

*Primary Examiner* — Ayaz R Sheikh
*Assistant Examiner* — Mang Boi Thawng
(74) *Attorney, Agent, or Firm* — The Farrell Law Firm, P.C.

(57) ABSTRACT

A system and a method are disclosed. The method includes configuring the UE with a first UL subband configuration for communicating with an external device, wherein the first UL subband configuration designates a first set of one or more resource blocks (RBs) inside of a carrier for the UE to perform UL transmission, receiving a downlink (DL) signal indication, and overriding the first UL subband configuration with a second subband configuration based on the DL signal indication, wherein the second subband configuration designates a first communication configuration of the first set of one or more RBs inside of a subband and a second communication configuration of a second set of RBs outside of the subband.

18 Claims, 13 Drawing Sheets

(51) Int. Cl.
*H04W 72/0457* (2023.01)
*H04W 72/232* (2023.01)

(58) Field of Classification Search
CPC ......... H04W 72/1273; H04W 72/0446; H04W 72/231; H04W 72/535; H04L 5/001; H04L 5/1469; H04L 5/0094
See application file for complete search history.

(56) References Cited

U.S. PATENT DOCUMENTS

| | | | | |
|---|---|---|---|---|
| 2024/0014996 | A1* | 1/2024 | Zhang | H04W 72/0446 |
| 2024/0179698 | A1* | 5/2024 | Zhang | H04W 72/044 |
| 2024/0291690 | A1* | 8/2024 | Bengtsson | H04W 72/0453 |
| 2025/0024435 | A1* | 1/2025 | Hao | H04W 72/11 |
| 2025/0184050 | A1* | 6/2025 | Wang | H04W 72/23 |
| 2025/0184105 | A1* | 6/2025 | Park | H04L 5/14 |
| 2025/0254018 | A1* | 8/2025 | Grant | H04L 27/2605 |
| 2026/0089045 | A1* | 3/2026 | Song | H04L 5/14 |

FOREIGN PATENT DOCUMENTS

| | | |
|---|---|---|
| WO | WO 2023/039324 | 3/2023 |
| WO | WO 2023/081133 | 5/2023 |
| WO | WO 2023/101518 | 6/2023 |

* cited by examiner

1200

DYNAMIC UPLINK AND DOWNLINK OPERATING SWITCHING IN WIRELESS COMMUNICATION SYSTEMS

CROSS-REFERENCE TO RELATED APPLICATION

This application claims the priority benefit under 35 U.S.C. § 119(e) of U.S. Provisional Application No. 63/442,223, filed on Jan. 31, 2023, the disclosure of which is incorporated by reference in its entirety as if fully set forth herein.

TECHNICAL FIELD

The disclosure generally relates to wireless communication systems. More particularly, the subject matter disclosed herein relates to uplink and downlink configurations in wireless communication systems.

SUMMARY

Wireless communication systems enable the exchange of information between various devices, including smartphones, tablets, Internet of things (IoT) devices, and more. These systems rely on a framework of protocols, standards, and configurations to ensure efficient data transmission.

In time-division duplex (TDD)-uplink (UL)-downlink (DL) systems (TDD-UL-DL), UL subbands may be allocated within symbols that are primarily designated as DL. This configuration allows for the simultaneous existence of UL and DL transmissions within the same symbol (or slot), maximizing spectrum utilization and network efficiency. However, this setup introduces a unique set of challenges.

A first challenge arises when UL subbands are configured within symbols primarily designated for DL. This dynamic configuration enables the coexistence of UL and DL transmissions within a single symbol, optimizing spectral efficiency. However, it also necessitates mechanisms to ensure smooth operation and avoid interference between UL and DL transmissions.

A second challenge emerges when UL subbands are configured within symbols marked as flexible by a TDD-UL-DL configuration (TDD-UL-DL-ConfigCommon or TDD-UL-DL-ConfigDedicated), which refers to a common configuration parameter related to TDD in fifth generation (5G) new radio (NR), as defined by the 3rd Generation Partnership Project (3GPP) standards. In these symbols, there are two possible operational scenarios outside the UL subband. One scenario restricts operations to DL reception only in the resource blocks (RBs) outside the UL subband, effectively treating those RBs as DL subbands. The second scenario allows for both DL and UL operations in the RBs outside the UL subband, categorizing them as either DL or UL subbands, respectively.

To enable these different operational scenarios, the present disclosure introduces the concept of switching operations. These switching operations involve transitions from transmitting in the UL portion of DL-UL-DL (D-U-D) of the symbols configured with UL subband to receiving in the DL portion of D-U-D of the symbols configured with UL subband, shifting from transmitting in the UL portion of D-U-D of the symbols configured with UL subband to transmitting in the UL portion of UL-UL-UL (U-U-U) of the symbols configured with UL subband which is equivalent to converting the DL subbands to UL subbands, or switching from transmitting in the UL portion of D-U-D of the symbols configured with UL subband to receiving in the DL portion of DL-DL-DL (D-D-D) of the symbols configured with UL subband which is equivalent to converting the UL subband to DL subband. These switching operations have significant implications for the power consumption of user equipment (UE) and the overall efficiency of the communication system. For example, if the UE is aware of transitions from transmitting in the UL portion of D-U-D of the symbols configured with UL subband to receiving in the DL portion of D-U-D of the symbols configured with UL subband, the UE may turn off its transmission chain and turn on its reception chain. Moreover, if the UE is aware of shifting from transmitting in the UL portion of D-U-D of the symbols configured with UL subband to transmitting in the UL portion of U-U-U of the symbols configured with UL subband, the UE may need to adjust its transmission bandwidth and be ready for transmitting on a wider bandwidth than the UL subband. Furthermore, if the UE is aware of switching from transmitting in the UL portion of D-U-D of the symbols configured with UL subband to receiving in the DL portion of D-D-D of the symbols configured with UL subband, the UE may turn off its transmission chain and turn on its reception chain.

To reduce power consumption and enhance network flexibility, UEs should be aware of the appropriate operation mode. This awareness necessitates the design of corresponding signals and mechanisms to facilitate smooth switching between subband full duplex (SBFD) and non-SBFD operation modes.

Furthermore, the disclosure describes scenarios where a single UL transmission spans both legacy UL symbols and SBFD symbols, where an SBFD symbol is a symbol with UL subband where that symbol is configured as DL or flexible by TDD-UL-DL-ConfigCommon. In such scenarios, it may be necessary to determine the applicable power control parameters, timing advance (TA), and other critical procedures so that the UE may be provided with separate configurations to be applied, for power control, TA, etc., depending on whether the UL transmission is fully confined within legacy UL symbols or fully confined with SBFD symbols.

According to an aspect of the disclosure, a method for overriding UL subband configurations in a UE includes configuring the UE with a first UL subband configuration for communicating with an external device, wherein the first UL subband configuration designates a first set of one or more RBs inside of a carrier for the UE to perform UL transmission, receiving a DL signal indication, and overriding the first UL subband configuration with a second subband configuration based on the DL signal indication, wherein the second subband configuration designates a first communication configuration of the first set of one or more RBs inside of a subband and a second communication configuration of a second set of RBs outside of the subband.

According to another aspect of the disclosure, a UE includes a memory device and a processing configured to execute instructions stored on the memory device. The instructions cause the processor to configure the UE with a first UL subband configuration for communicating with an external device, wherein the first UL subband configuration designates a first set of one or more RBs inside of a carrier for the UE to perform UL transmission, receive a DL signal indication, and override the first UL subband configuration with a second subband configuration based on the DL signal indication, wherein the second subband configuration designates a first communication configuration of the first set of one or more RBs inside of the subband and a second communication configuration of a second of one or more RBs outside of the subband.

BRIEF DESCRIPTION OF THE DRAWING

In the following section, the aspects of the subject matter disclosed herein will be described with reference to exemplary embodiments illustrated in the figures, in which.

DETAILED DESCRIPTION

Figure 1:
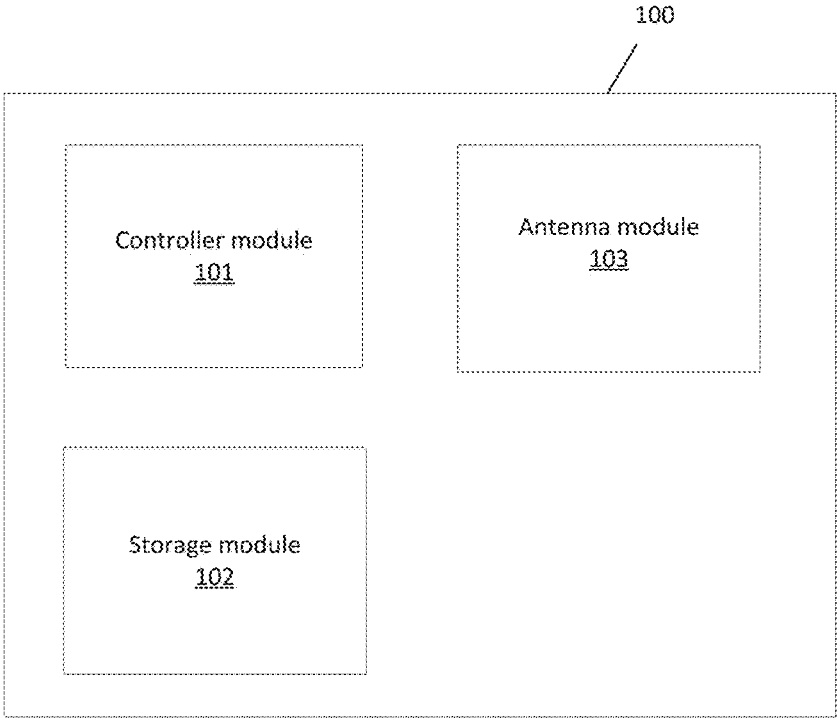
FIG. 1 illustrates a transmitting device or a receiving device in a communication system, according to an embodiment.

In the following detailed description, numerous specific details are set forth in order to provide a thorough understanding of the disclosure. It will be understood, however, by those skilled in the art that the disclosed aspects may be practiced without these specific details. In other instances, well-known methods, procedures, components and circuits have not been described in detail to not obscure the subject matter disclosed herein.

Reference throughout this specification to "one embodiment" or "an embodiment" means that a particular feature, structure, or characteristic described in connection with the embodiment may be included in at least one embodiment disclosed herein. Thus, the appearances of the phrases "in one embodiment" or "in an embodiment" or "according to one embodiment" (or other phrases having similar import) in various places throughout this specification may not necessarily all be referring to the same embodiment. Furthermore, the particular features, structures or characteristics may be combined in any suitable manner in one or more embodiments. In this regard, as used herein, the word "exemplary" means "serving as an example, instance, or illustration." Any embodiment described herein as "exemplary" is not to be construed as necessarily preferred or advantageous over other embodiments. Additionally, the particular features, structures, or characteristics may be combined in any suitable manner in one or more embodiments. Also, depending on the context of discussion herein, a singular term may include the corresponding plural forms and a plural term may include the corresponding singular form. Similarly, a hyphenated term (e.g., "two-dimensional," "pre-determined," "pixel-specific," etc.) may be occasionally interchangeably used with a corresponding non-hyphenated version (e.g., "two dimensional," "predetermined," "pixel specific," etc.), and a capitalized entry (e.g., "Counter Clock," "Row Select," "PIXOUT," etc.) may be interchangeably used with a corresponding non-capitalized version (e.g., "counter clock," "row select," "pixout," etc.). Such occasional interchangeable uses shall not be considered inconsistent with each other.

Also, depending on the context of discussion herein, a singular term may include the corresponding plural forms and a plural term may include the corresponding singular form. It is further noted that various figures (including component diagrams) shown and discussed herein are for illustrative purpose only, and are not drawn to scale. For example, the dimensions of some of the elements may be exaggerated relative to other elements for clarity. Further, if considered appropriate, reference numerals have been repeated among the figures to indicate corresponding and/or analogous elements.

The terminology used herein is for the purpose of describing some example embodiments only and is not intended to be limiting of the claimed subject matter. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that when an element or layer is referred to as being on, "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numerals refer to like elements throughout. As used herein, the term "and/or" includes any and all combinations of one or more of the associated listed items.

The terms "first," "second," etc., as used herein, are used as labels for nouns that they precede, and do not imply any type of ordering (e.g., spatial, temporal, logical, etc.) unless explicitly defined as such. Furthermore, the same reference numerals may be used across two or more figures to refer to parts, components, blocks, circuits, units, or modules having the same or similar functionality. Such usage is, however, for simplicity of illustration and ease of discussion only; it does not imply that the construction or architectural details of such components or units are the same across all embodiments or such commonly-referenced parts/modules are the only way to implement some of the example embodiments disclosed herein.

Unless otherwise defined, all terms (including technical and scientific terms) used herein have the same meaning as commonly understood by one of ordinary skill in the art to which this subject matter belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As used herein, the term “module” refers to any combination of software, firmware and/or hardware configured to provide the functionality described herein in connection with a module. For example, software may be embodied as a software package, code and/or instruction set or instructions, and the term “hardware,” as used in any implementation described herein, may include, for example, singly or in any combination, an assembly, hardwired circuitry, programmable circuitry, state machine circuitry, and/or firmware that stores instructions executed by programmable circuitry. The modules may collectively or individually, be embodied as circuitry that forms part of a larger system, for example, but not limited to, an integrated circuit (IC), system on-a-chip (SoC), an assembly, and so forth.

FIG. 1 illustrates a transmitting device or a receiving device in a communication system, according to an embodiment.

Referring to FIG. 1, the device 100 may be a UE (e.g., a client device) or a gNB and includes a controller module 101 (e.g., a processor), a storage module 102, and an antenna module 103.

The controller module 101, storage module 102, and antenna module 103 may be structural components to facilitate efficient and accurate transmission or reception of wireless signals. As described herein, the wireless signals that are transmitted may be compressed (e.g., encoded) prior to transmission and reassembled (e.g., decoded) after reception. The device 100 may include all of the structural components necessary to compress, transmit, receive, and/or decompress the wireless signals.

The controller module 101 may include at least one processor and may execute instructions that are stored in the storage module 102. For example, the controller module 101 may execute instructions for performing compression, decompression, and signaling techniques described herein. In addition, the controller module 101 may include a digital signal processor (DSP) for performing signal processing on a signal. The DSP may include one or more processing modules for functions such as synchronization, equalization, and demodulation. The processing modules may be implemented using one or more DSP techniques, such as fast Fourier transform (FFT), inverse FFT (IFFT), and digital filtering. Additionally or alternatively, the controller module 101 may include an application processor for running user applications on the device 100, such as web browsers, video players, and other software applications. The application processor may include one or more processing units, memory devices, and input/output interfaces.

The storage module 102 may include transitory or non-transitory memory storing instructions that, when executed, cause the controller module 101 to perform steps to execute signaling techniques described herein. In addition, the storage module 102 may include a protocol stack for implementing communication protocols. The protocol stack may include one or more layers, such as a physical layer, a medium access control (MAC) layer, a radio link control (RLC) layer, and a packet data convergence protocol (PDCP) layer.

The antenna module 103 may include one or more antennas for wirelessly transmitting and receiving signals to a base station, UE or another device. For example, the antenna module 103 may receive a signal transmitted by a base station and convert it into an electrical signal.

The device 100 may be a receiver of a wireless communication system (e.g., the UE in 5G NR system) in DL. Additionally or alternatively, the UE may modulate (e.g., compress) and transmit signals to the gNB. Also, the device 100 may also transmit a signal via the antenna module 103 and, therefore, may be a transmitter or a gNB.

Although various embodiments are described herein with reference to a UL subband configured in symbols or slots configured as downlink “D” or flexible “F” by either TDD-UL-DL-ConfigCommon or TDD-UL-DL-ConfigDedicated, they can also be extended for the case when DL subband is in symbols or slots configured as uplink “U” or “F” by TDD-UL-DL-ConfigCommon or TDD-UL-DL-ConfigDedicated.

Figure 2:
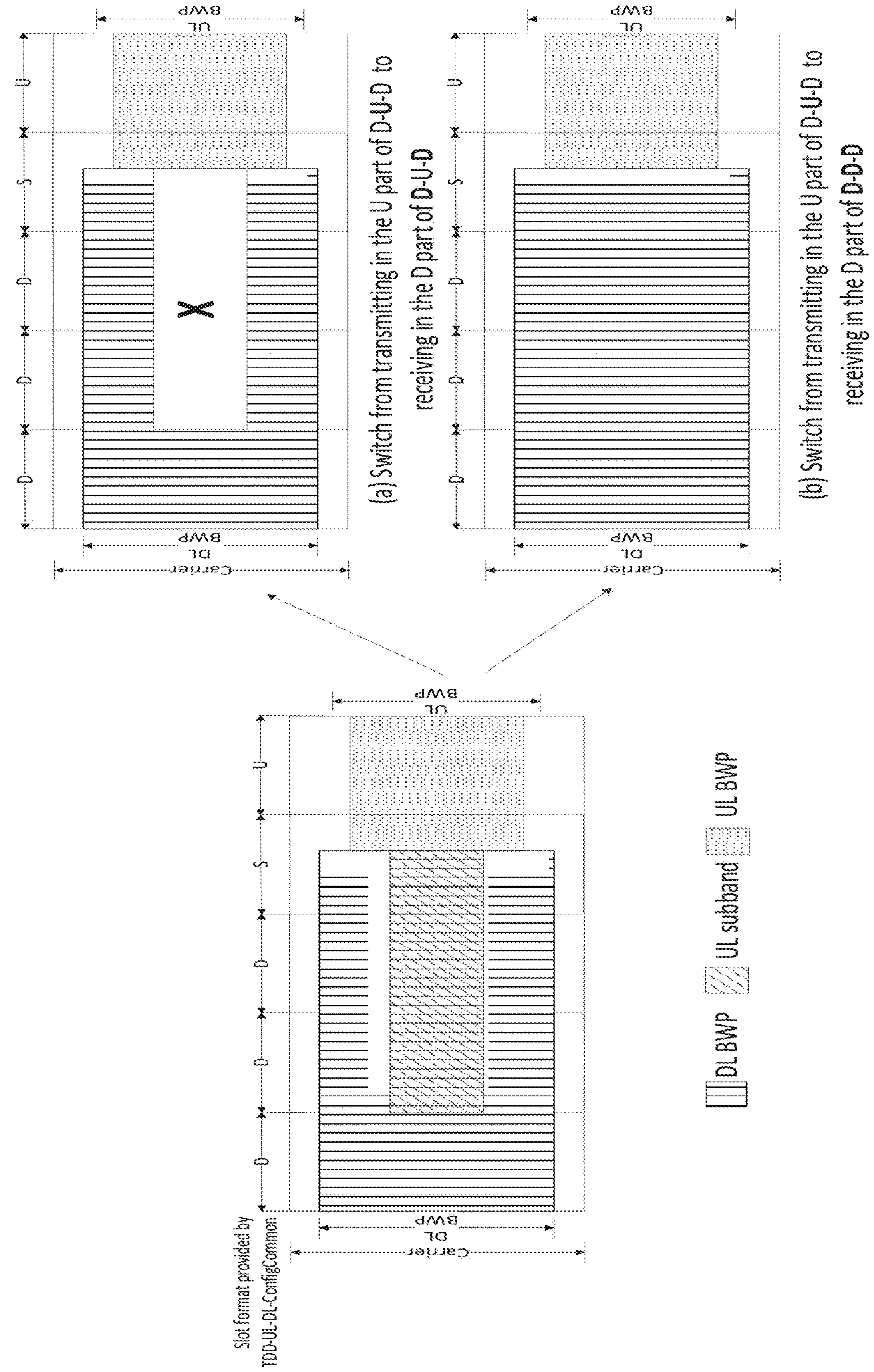
FIG. 2 is a resource grid illustrating switching behavior for a UL subband in symbols configured as "D", according to an embodiment.

FIG. 2 is a resource grid illustrating switching behavior for a UL subband in symbols configured as “D”, according to an embodiment.

In TDD systems, communication channels are divided into different time symbols. Some of these symbols are allocated for DL transmission, where the gNB sends data/control information/reference signals to the UE, while others are allocated for UL transmission, where the UE sends data/control information/reference signals to the gNB. Moreover, there is a third category of symbols allocated as flexible which may be used DL transmission or UL transmission based on the scheduling needs.

When a symbol is configured as “D” or designated as a DL symbol, it means that it is primarily intended for the transmission of data from the base station to the UE. When a symbol or slot is configured as “U” or designated as a UL symbol, it means that it is primarily intended for the transmission of data from the gNB to the UE.

Referring to FIG. 2, in the context of UL subband operation in symbols configured as “D”, a particular scenario arises where the UL subband is situated within a slot alongside a set of RBs used for DL reception.

In (a) of FIG. 2, a scenario is shown where the UL subband occupies a set of RBs for UL transmission, surrounded by another set of RBs meant for DL reception. This configuration is represented in the frequency domain as D-U-D, with the UL subband situated centrally with respect to the carrier. Here, the gNB might signal the UE to transition from transmitting in the UL subband of the D-U-D configuration to only receiving in the surrounding RBs (receiving in “D” of D-U-D). The bold text (e.g., “D-U-D” or “D-U-D”) corresponds to the subband(s) (or RB sets) used by a particular UE. This switching mode shown in (a) of FIG. 2 could be beneficial when the gNB intends to send DL information to a specific UE, ensuring the UL subband remains accessible to other UEs.

In (b) of FIG. 2, a scenario is shown where the gNB can repurpose the RB set initially reserved for the UL subband for DL reception. This is similar to switching off the UL subband and transitioning it to a DL. The gNB might instruct the UE to move from transmitting in the central UL subband of the D-U-D arrangement to receiving in all the RB sets around it, forming a D-D-D configuration. This mode is beneficial when the gNB wants to deliver DL information across the entire DL bandwidth part (BWP) of the UE.

Accordingly, the gNB can transmit indications to the UE regarding expected DL reception in the RB sets surrounding the UL subband. Upon receiving this indication, the UE may exhibit several behaviors.

For example, a first UE behavior upon receiving the indication may be that the UE might not anticipate dynamic UL grants that schedule UL transmissions like physical uplink shared channel (PUSCH) signals, physical uplink control channel (PUCCH) signals, sounding reference signal (SRS) signals, or the physical random access channel (PRACH) signals within the UL subband. The UE may also presume that UL transmissions, either configured or initiated by higher-layer signaling (e.g., radio resource control (RRC) signaling or medium access control (MAC)-control element (CE) signaling), are either released or deactivated.

Another UE behavior upon receiving the indication may be that the UE may expect DL transmissions restricted to the DL BWP directly associated with the UL subband or the UL BWP containing the UL subband.

An additional UE behavior upon receiving the indication may be restricted DL reception. For example, for a set of RBs within the UL subband, the UE might not anticipate DL transmissions in this set, as depicted in (a) of FIG. 2. On the other hand, as shown in (b) of FIG. 2, DL transmissions could occur within the RB set that would typically be occupied by the UL subband.

The aforementioned indications might be transmitted through Layer 1 signaling (L1), such as PDCCH, or higher-layer signaling protocols, such as MAC-CE or RRC. For PDCCH indications, these might be either group-common or specific to the UE. A new field could also be used to specify which of the two scenarios ((a) or (b) in FIG. 2) is to be applied. Additionally or alternatively, the new field (or an additional new field) could be used when a single scenario is supported to indicate when it is activated. This indication may also provide the duration for which a particular scenario should be in effect.

Figure 3:
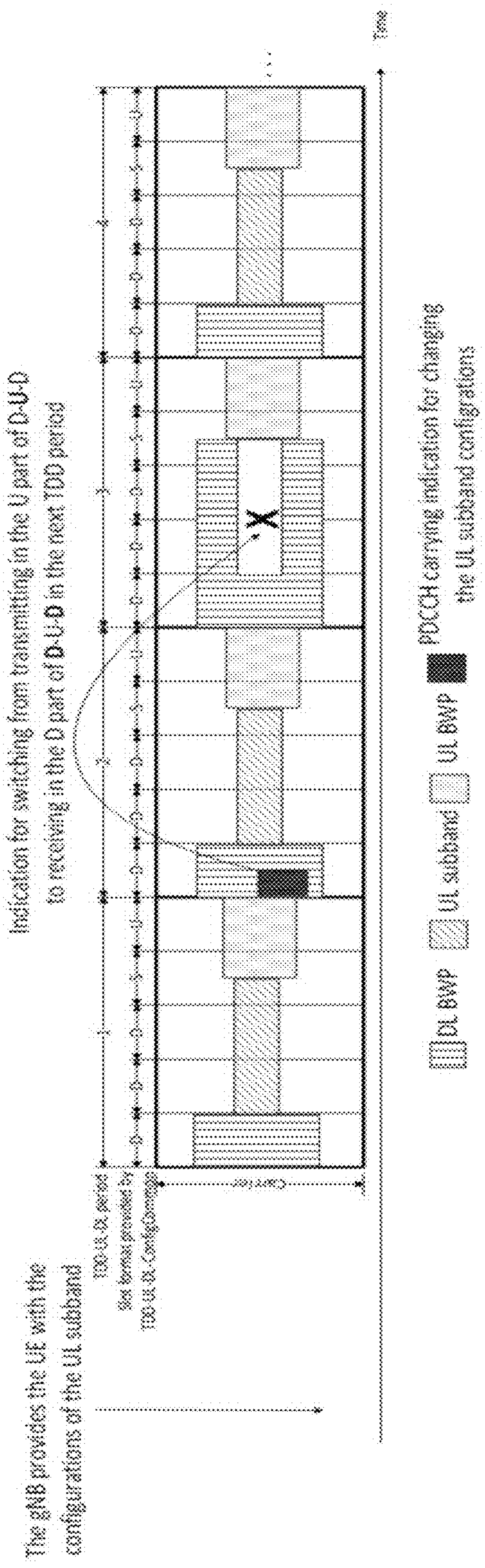
FIG. 3 is a resource grid illustrating switching from UL transmission to receiving in RB sets around a UL subband, according to an embodiment.

FIG. 3 is a resource grid illustrating switching from UL transmission to receiving in RB sets around a UL subband, according to an embodiment.

Referring to FIG. 3, dynamic switching between UL transmission and DL reception within a TDD-UL-DL context is shown. The horizontal axis of FIG. 3 indicates the temporal progression of the TDD-UL-DL configurations across multiple periods.

Within each period, the UL subband occupies the slots 1, 2, and portion of the slot 3 which is indicated as "D" in each TDD-UL-DL period.

A change in the configuration pattern occurs in the third TDD-UL-DL period, indicated by a marked "X". The change in configuration may be based on an instruction received through the PDCCH. This instruction prompts the UE to transition from transmitting in the U segment of the D-U-D configuration to receiving in the D segment of the D-U-D. Consequently, the UE starts receiving information in the DL in the RB sets surrounding the UL subband.

Following this switch, in the 4th TDD-UL-DL period, the UE resumes its initial UL subband configuration after the brief period of DL reception.

With respect to determining the duration at which the switched scenario is applied within a period, as depicted in (a) and (b) of FIG. 2, several methods can be utilized. One such method involves the indication in PDCCH specifying the duration during which the UL subband's configuration is overridden. The DCI might detail the starting symbol, slot, subframe, frame, and the corresponding duration in units such as slots, symbols, or milliseconds (ms), or the DCI might indicate the starting and ending symbol, slot, etc. These indications can be given either separately or in conjunction. When jointly provided, it may appear similar to start location and internal values (SLIVs) found in a time domain resource allocation (TDRA) table, where multiple combinations of starting and duration values are preset through high layer signaling, such as RRC, encompassing 16 values. Then the DCI may use a 4 bit-field to indicate which index may be applied. In a case of a separate indication, the higher layer signaling such as RRC can indicate separate values for the start and duration/end. Then separate fields in the DCI can indicate the start and duration from the configured values. Rather than configuring the start or duration values by RRC, or in the event of the absence of RRC configuration, predefined values provided by predetermined specifications may be used and the DCI may indicate one value from them. For instance, for the indication of the start, it may be in the form of an offset in units of slots and an offset in units of symbols within the indicated slot.

Another method entails the use of a bitmap in the PDCCH to pinpoint when the UL subband should be overridden. This bitmap could illustrate which symbol, slot, subframe, or TDD-UL-DL period is set to override the UL subband's configuration. Each individual bit in the bitmap can represent either a single or multiple consecutive symbols, slots, subframes, or TDD-UL-DL periods, with the granularity of each bit determined by higher layer signaling or being predetermined. For example, the most significant bit may correspond to a first or last symbol carrying the PDCCH, the slot or subframe in which the PDCCH is transmitted, or the TDD-UL-DL period of the PDCCH, the second most significant bit may correspond to the next time unit relevant to PDCCH, and so on.

Another approach may use predefined rules to determine the duration the UL subband's configuration is overridden. This method could reduce the DCI payload as it may not require a dedicated field in the DCI. A potential rule may be that the override applies after a certain offset (an offset value) from the PDCCH bearing the indication. The offset value may be provided to the UE by higher layer signaling such as RRC or MAC-CE, or may be predefined, i.e., provided in a predefined specification. The offset may be relative to the first or last symbol carrying the PDCCH, the slot or subframe boundaries in which the PDCCH is transmitted, or the TDD-UL-DL period in which the PDCCH is transmitted. The duration of overriding the UL subband configurations may be provided to the UE by higher layer signaling such as RRC or MAC-CE, or may be predefined, i.e., provided in a predefined specification. For example, a simple rule may be that the overriding of the UL subband configuration may occur in the next TDD-UL-DL period after the TDD-UL-DL period at which PDCCH is transmitted.

The TDD-UL-DL period can also reflect the periodicity of "pattern1" plus the periodicity of "pattern2", if both are defined in the TDD-UL-DL-ConfigCommon or TDD-UL-DL-ConfigDedicated. After the duration of overriding the UL subband configurations concludes, the UE could potentially revert to employing the previously indicated UL subband configurations. Additionally or alternatively, the UE might switch back to the originally set UL subband upon receipt of an explicit indication, potentially using another 1-bit field. A timer could also be incorporated, configured through higher layer signaling or pre-established, e.g., provided in a predefined specification, to ensure the gNB and UE share a mutual understanding of the operational scenario. If no clear directive for reverting back to the given UL subband configuration is received upon this timer's expiration, the UE might choose to revert automatically.

In situations where a scenario from (a) or (b) of FIG. 2 is activated, a single bit might be employed to signify activation of the relevant scenario. The gNB could convey the indication to the UE through higher layer signaling methods, such as RRC or MAC-CE. Solutions previously mentioned for signifying the relevant scenario, time frame, or timer could be employed in this context. When utilizing RRC or MAC-CE to indicate when the UL subband configurations should be overridden, this indication might be applied on a recurring basis. The aforementioned solutions described for indicating the applicable scenario, duration, or timer can be applied here. For example, RRC may configure multiple patterns for overriding the UL subband configurations and MAC-CE may select one of them to be applied. Alternatively, within one or several TDD-UL-DL periods, RRC or MAC-CE could specify the exact symbol, slot, subframe, or TDD-UL-DL period wherein the UL subband configurations should be overridden. This instruction can also be applied at regular intervals. Accordingly, higher layer signals, such as RRC or MAC-CE, might indicate a temporal pattern during which the configurations of the UL subband are overridden, with this pattern repeating at set intervals. The frequency (periodicity) of this repetition could be indicated by higher layer signaling techniques such as RRC or MAC-CE, and might be equivalent to a TDD-UL-DL period or an integer multiple or inter-factor of it. Furthermore, in addition to previously mentioned methods for indicating the start, duration, or end of the duration, where the UL subband configurations might be overridden may also be applied. The start of the duration could be set relative to the period boundaries using an offset in a set number of slots or symbols from the start of the period or an offset in units of symbols in the indicated slot.

Figure 4:
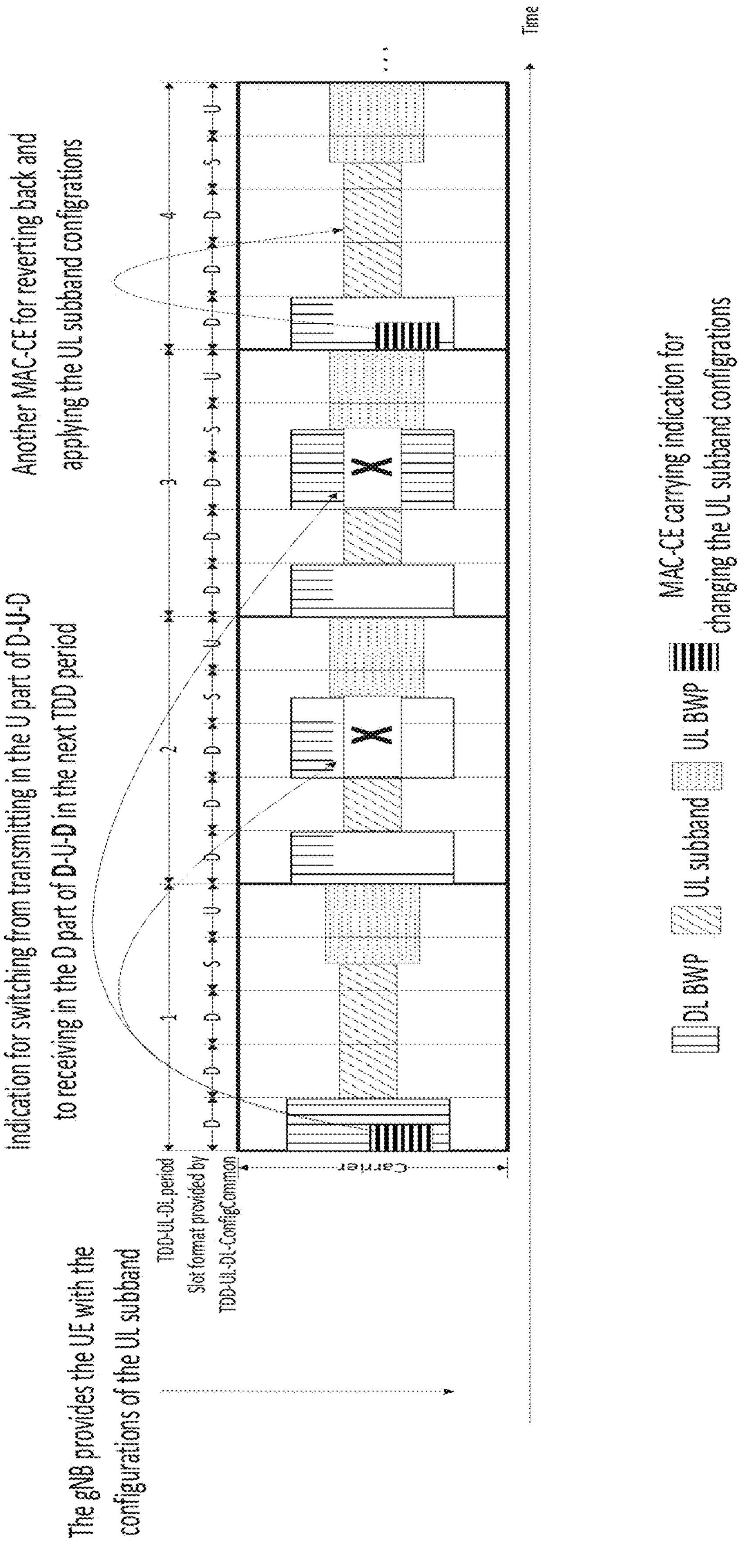
FIG. 4 is a resource grid illustrating using medium access control-control element (MAC-CE) to override the UL subband configuration in multiple TDD-UL-DL periods, according to an embodiment.

FIG. 4 is a resource grid illustrating using MAC-CE to override the UL subband configuration in multiple TDD-UL-DL periods, according to an embodiment.

Referring to FIG. 4, four distinct TDD-UL-DL periods are illustrated. These periods may be equal in duration. Portions of the DL BWP within some periods are marked with an "X" symbol indicating the TDD-UL-DL periods which the UL subband configuration is to be overridden. The MAC-CE provides a time pattern or indicates which timer pattern from a configured set for determining whether the UL subband configuration is to be overridden and/or when the UL subband configuration is to be overridden. The UE may switch from transmitting (D-U-D) to receiving (D-U-D) to reception in surrounding RBs for periods in which the UL subband configuration undergoes an override.

RRC can be used to signify the time pattern during which the UL subband configurations experience an override. This indicated pattern may persist until there's a system reconfiguration or release.

In situations where the UE requires adjustments to its transceiver based on the switching command, a minimum time duration between reception of an indication to the instance at which the UL subband configuration is overridden may be needed.

For example, when PDCCH is used to provide the indication, the UE may anticipate a minimum time span defined between the concluding or initiating symbol that carries the PDCCH, the slot or subframe boundaries including the transmission of the PDCCH, or within the TDD-UL-DL period where the PDCCH is dispatched, and the instance at which the UL subband configuration is overridden.

Furthermore, various protocols can be adopted to obtain a minimum time duration. In addition, the UE may have the capacity to communicate this minimum time duration to the gNB, facilitated by capability signaling. The duration might depend on the SCS, or may be predefined. Also, the duration could be reflective of other UE capabilities. For example, this minimum time duration can either match or be determined by the PDSCH or PUSCH processing timelines ($T_{proc,1}$ or $T_{proc,2}$). Additionally, the duration might coincide with, or be derived from, a timeDurationForQCL parameter as indicated by the UE. In addition, this time duration could also be equated with, or be derived from, the BWP switching time.

For indicating the time duration based on the MAC-CE, the UE may apply the received indication subsequent to the transmission a hybrid automatic repeat request (HARQ)-Acknowledgment (HARQ-ACK) pertaining to that particular MAC-CE. This indication might be activated in the slot that directly follows slot $$n + 3N_{slot}^{subframe,\mu},$$

with "n" denoting the slot reserved for the HARQ-ACK of the MAC-CE and "μ" denoting the SCS of PUCCH carrying the HARQ-ACK. When the system uses RRC for time duration operations, a specific offset, defining the juncture at which the indicator gets activated, could either be transmitted via higher layer signaling or be predefined. Alternatively, the indication might be based on certain protocols, similar to those followed in the context of MAC-CE.

For the UL subband symbols configured as "F" (for "flexible", where an "F" symbol can be used for either DL or UL transmission), the utilization of the UL subband may entail occupation of a specified set of RBs for UL transmission. This set may be bordered by another set of RBs, which might be designated for either DL reception or additional UL transmission. If the adjacent RBs are exclusively reserved for DL reception, the solutions previously proposed for the UL subband configured as "D" can be applied.

On the other hand, if the surrounding RBs have the flexibility for either DL reception or UL transmission, the gNB maintains the responsibility to instruct the UE regarding the operations to be executed within this set. There are a few possible scenarios that the gNB might convey to the UE, detailing the switching operations.

Figure 5:
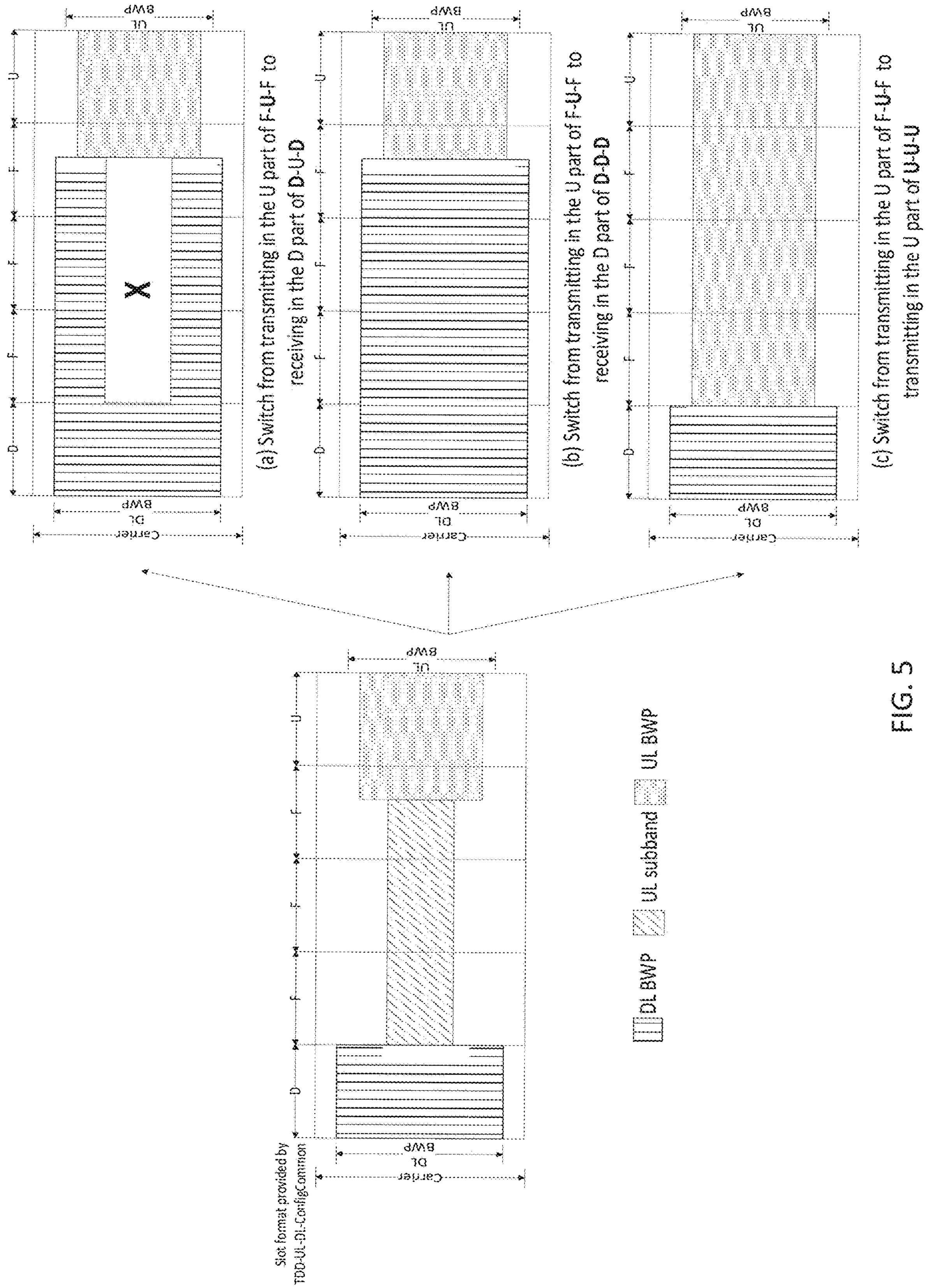
FIG. 5 is a resource grid illustrating switching behavior for a UL subband in symbols configured as "F", according to an embodiment.

FIG. 5 is a resource grid illustrating switching behavior for a UL subband in symbols configured as "F", according to an embodiment.

In a first scenario, as depicted in (a) of FIG. 5, the UE switches from transmitting within the UL subband, specified in symbols denoted with "F", to a mode where it exclusively receives data within the neighboring RBs in the DL BWP.

In a second scenario, as depicted in (b) of FIG. 5, the UE, after transmitting within the UL subband, switches to receive across all RBs confined within the DL BWP.

In a third scenario, illustrated in (c) of FIG. 5, the UE switches from transmitting within the UL subband to broadcasting across all RBs confined within its UL BWP.

The gNB possesses the capability to signal to the UE the specific scenario ((a), (b), or (c) of FIG. 5) to implement. Depending on the indicated scenario, the UE will adopt a certain behavior. For instance, in the situation represented by (a) of FIG. 5, the UE prepares itself to receive DL transmissions that are confined within the DL BWP either directly related to the UL subband or associated with the UL BWP encompassing the UL subband. Yet, the UE may not anticipate receiving signals in the RBs set within the UL subband. At the same time, the UE may not expect to expect to receive a dynamic UL grant that schedules UL transmission, e.g., PUSCH, PUCCH, SRS, or PRACH, in the UL subband. The UE may also assume that UL transmissions configured or activated by higher layer signaling, e.g., RRC or MAC-CE, are released or deactivated, respectively.

On the other hand, in the case of (b) of FIG. 5, the UE may anticipate the reception of DL transmissions within the RBs of the UL subband, implying a potential cancelation of the UL subband.

Furthermore, in the case of (c) of FIG. 5, the UE's transmissions in the UL are confined within the UL BWP directly associated with the UL subband or associated with the DL BWP containing the UL subband, e.g., the UL BWP-DL BWP pair that has the same Id. This may be equivalent to expanding the UL subband to cover the whole UL BWP.

The transmission of the indication (or instruction) of which approach to apply may use any of the aforementioned solutions for the UL subband in symbols labeled as "D". However, an indication field's bitwidth might be broader to encompass all potential scenarios. Furthermore, the UE's operations can align with the bandwidths of either the DL BWP or the UL BWP. Under certain configurations, the UE might necessitate having its radio frequency (RF) front set for DL reception based on DL BWP. In other scenarios, additional RF fronts might be required for UL transmissions, contingent on the UL subband's bandwidth. In this case, no additional delay is needed other than the delay necessary to decode the channel that carries the indication or the grant for the implicit indication as described later, e.g., PDCCH or PDSCH for MAC-CE. Therefore, it may be beneficial to have a predefined duration, e.g., provided in a predefined specification, from the instance of receiving the indication for overriding the UL subband configurations to the instance at which the UL subband configurations are overridden. In this case, the UE may indicate to the gNB whether this duration is needed or not via capability signaling, for example, based on the UE implementation.

Additionally, with the UL subband in symbols tagged as "F", the UE might convey varying durations to the gNB, contingent on the specific switching scenario. The duration required to override the UL subband configurations for scenarios depicted in (a) and (b) of FIG. 5 might diverge from that needed for (c) of FIG. 5. The differentiation may relate to the UE's operational requirements in each scenario. For instance, the transitions from UL transmission in the UL subband to DL reception in the DL BWP might necessitate distinct durations compared to adjustments in operating bandwidths.

The manner in which the indication or instruction (e.g., a DL signal indication) has been described thus far in the description may be considered to be an "explicit" indication. However, several of these developed solutions can be used for the purposes of providing an "implicit" indication or instruction. Instead of relying on explicit signaling for transitions between a transmitting UL in the UL subband, as depicted in FIGS. 2-5, implicit methods stand as efficient alternatives, primarily due to their ability to reduce signaling overheads.

Implicit indication may be based on the concept of dynamic scheduling. In instances where the UL subband is configured in symbols that are denoted as "D", the allocation for dynamic DL transmissions, such as PDSCH or aperiodic (AP)-CSI-reference signal (RS), can act as implicit switching commands. The UE may infer that all the RBs encapsulated by the dynamic DL transmission are earmarked for DL transmission. These transmissions may be demarcated strictly within the DL BWP, corresponding either to the UL subband or its associated UL BWP.

In addition, the UE may determine that all RBs present within its DL BWP, including those in the UL subband, are available for DL reception, regardless of whether there's an overlap of the dynamic DL transmission with the UL subband in the frequency domain, similar to (b) of FIG. 2.

Figure 6:
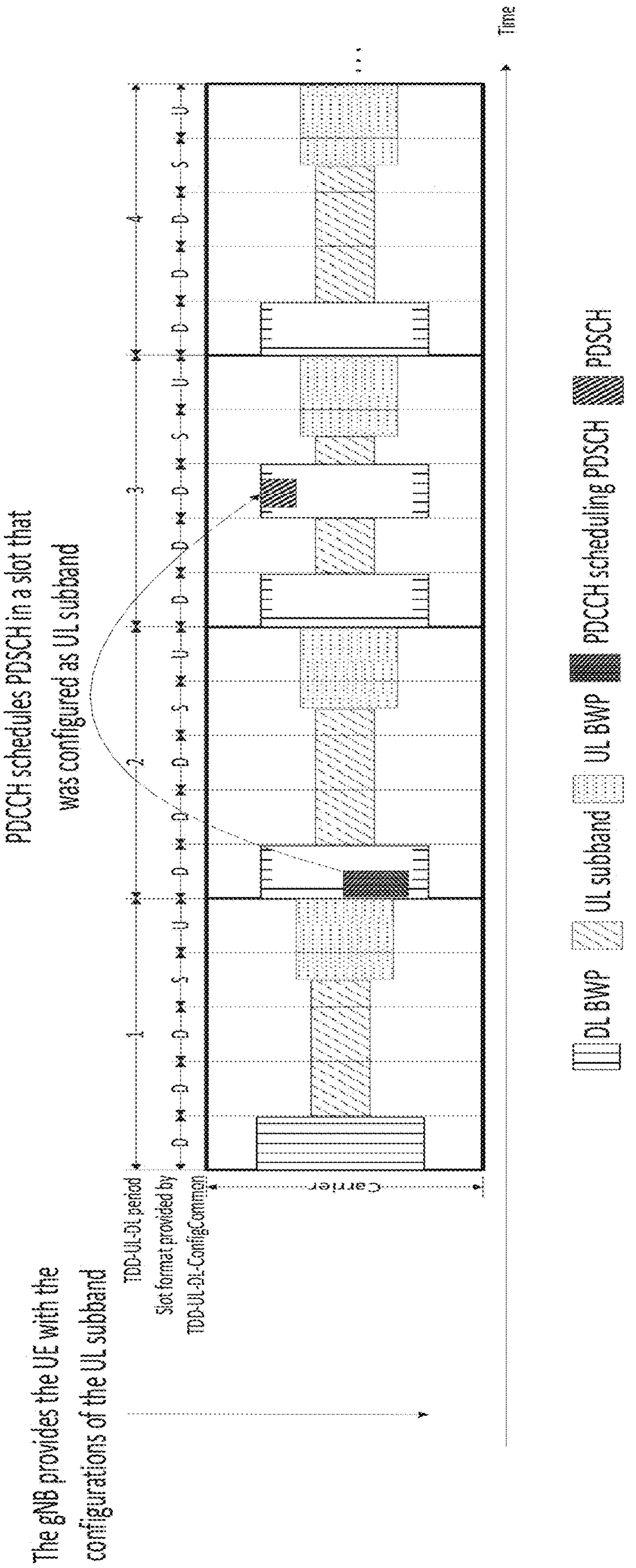
FIG. 6 is a resource grid illustrating using a dynamic grant for indicating that an entire DL bandwidth part (BWP) is available for DL reception, according to an embodiment.

FIG. 6 is a resource grid illustrating using a dynamic grant for indicating that an entire DL BWP is available for DL reception, according to an embodiment.

Referring to FIG. 6, a PDCCH is used to schedule a PDSCH within a slot originally designated to include a UL subband. While the PDSCH may not consume the entirety of the slot, the UE may use the slot for DL reception, strictly within the DL BWP.

The UE may assume that the UL subband might be overridden, but this assumption is typically bounded within specific symbols or slots adjacent to the dynamic DL grant, covering time units as extensive as entire subframes, radio frames, or TDD-UL-DL periods, especially those encapsulating the dynamic DL grant. For example, the UL subband configuration may be overridden in the whole subframe, radio frame, TDD-UL-DL period, etc., that includes the dynamic DL grant. The number of such symbols, slots, etc. surrounding the dynamic DL grant in which UL subband configurations to be overridden may be configured by higher layer signaling, predefined, or indicated via UE capability signaling.

In instances where the dynamic DL allocation does not overlap with the UL subband within the frequency domain, the UE may determine that RBs affiliated with the UL subband are unavailable for DL reception, similar to (a) of FIG. 2. However, if this dynamic allocation either partially or entirely overlaps with RBs marked by the UL subband, the UE may determine that the complete DL BWP is accessible for DL reception, including the RBs outlined by the UL subband.

Figure 7:
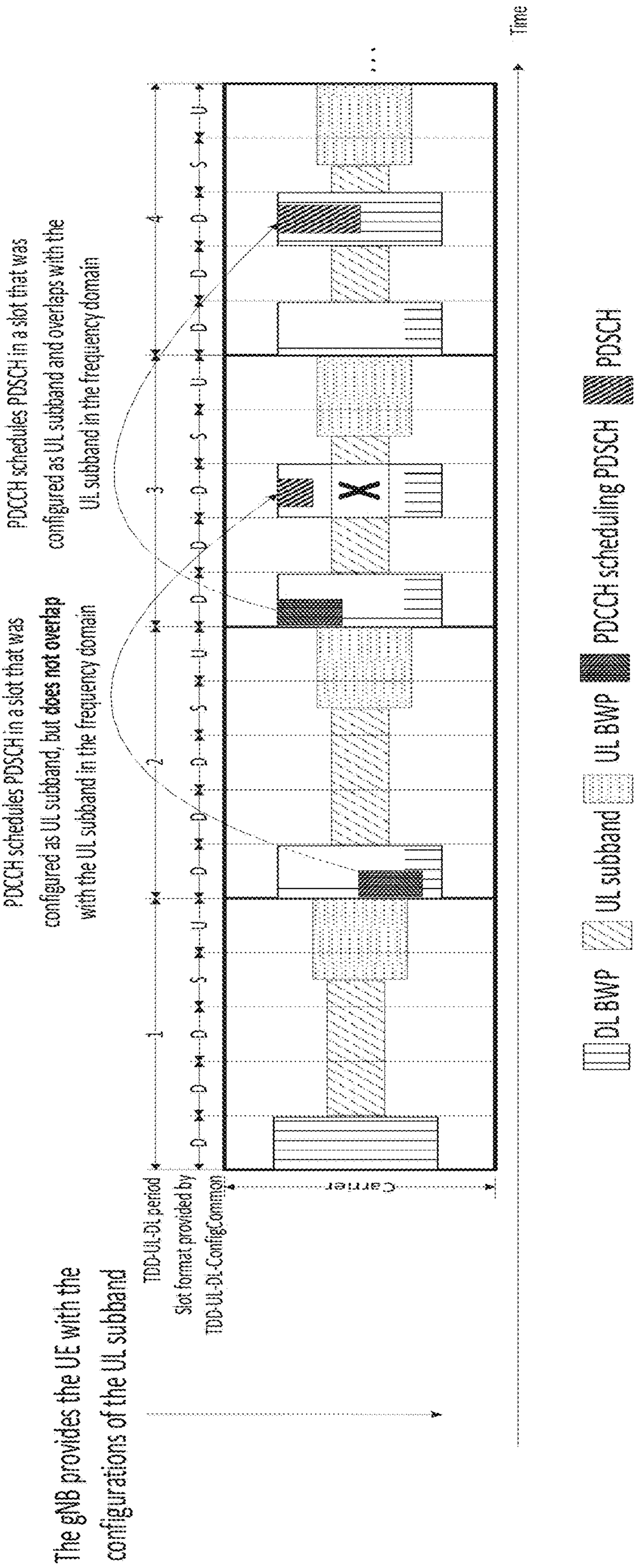
FIG. 7 is a resource grid illustrating using a dynamic grant for indicating that a portion of a DL BWP, excluding the RBs allocated to the UL subband, is available for DL reception, according to an embodiment.

FIG. 7 is a resource grid illustrating using a dynamic grant for indicating that a portion of a DL BWP, excluding the RBs allocated to the UL subband, is available for DL reception, according to an embodiment.

Referring to FIG. 7, two PDCCHs scheduling PDSCHs in a slot that was originally configured to include a UL subband are shown. In a situation where one PDSCH remains non-overlapping with the UL subband in its frequency domain, yet the other intersects, the UE may determine the entire slot having the initial PDSCH is usable for DL reception within the DL BWP, but exclude RBs reserved for the UL subband, similar to the scenario in (a) of FIG. 2. For the subsequent PDSCH, the UE may expect every RB within the DL BWP, including those aligned with the UL subband, to be open for DL reception, similar to (b) of FIG. 2.

The UE may operate on the assumption that any UL subband is superseded by a specific count of symbols, slots, etc., surrounding the dynamic DL grant, such as the entire subframe, radio frame, or the TDD-UL-DL duration, that encompasses the dynamic DL grant.

If there are multiple dynamic DL allocations, the aforementioned procedures may be applied to determine whether or not the RBs confined within UL subband can be used for DL reception. The difference is that the UE may determine the behavior based on the dynamic DL allocation that overlap with the RBs set spanned by the UL subband.

A time of use may be similar to the explicit indication case to determine the minimum time duration between the first or last symbol carrying the PDCCH, the slot or subframe boundaries in which the PDCCH is transmitted, or the TDD-UL-DL period in which the PDCCH is transmitted, and the instance at which the UL subband configuration is overridden. For the case in which an UL subband is configured with symbols configured as "F", allocating a dynamic DL transmission (e.g., PDSCH, aperiodic channel state information-reference signal (AP-CSI-RS), etc.) may be used as an implicit switching command. The aforementioned solutions for the case for UL subband in symbols configured as "D" can be applied to determine whether the scenario (a) of FIG. 5 (converting the symbol to DL with DL BWP excluding the RBs set within the UL subband), or the scenario (b) of FIG. 5 (converting the symbol to DL with DL BWP including the RBs set within the UL subband) is applied. For the scenario in (c) of FIG. 5 (converting the symbol to UL within the UL BWP), dynamic UL allocation (PUSCH, PUCCH, SRS, etc.) may be used for this purpose. Specifically, if the dynamic UL allocation occupies a bandwidth larger than the UL subband, but is still confined within the UE UL BWP, the UE may determine that the whole UL BWP may be used for UL transmission.

Figure 8:
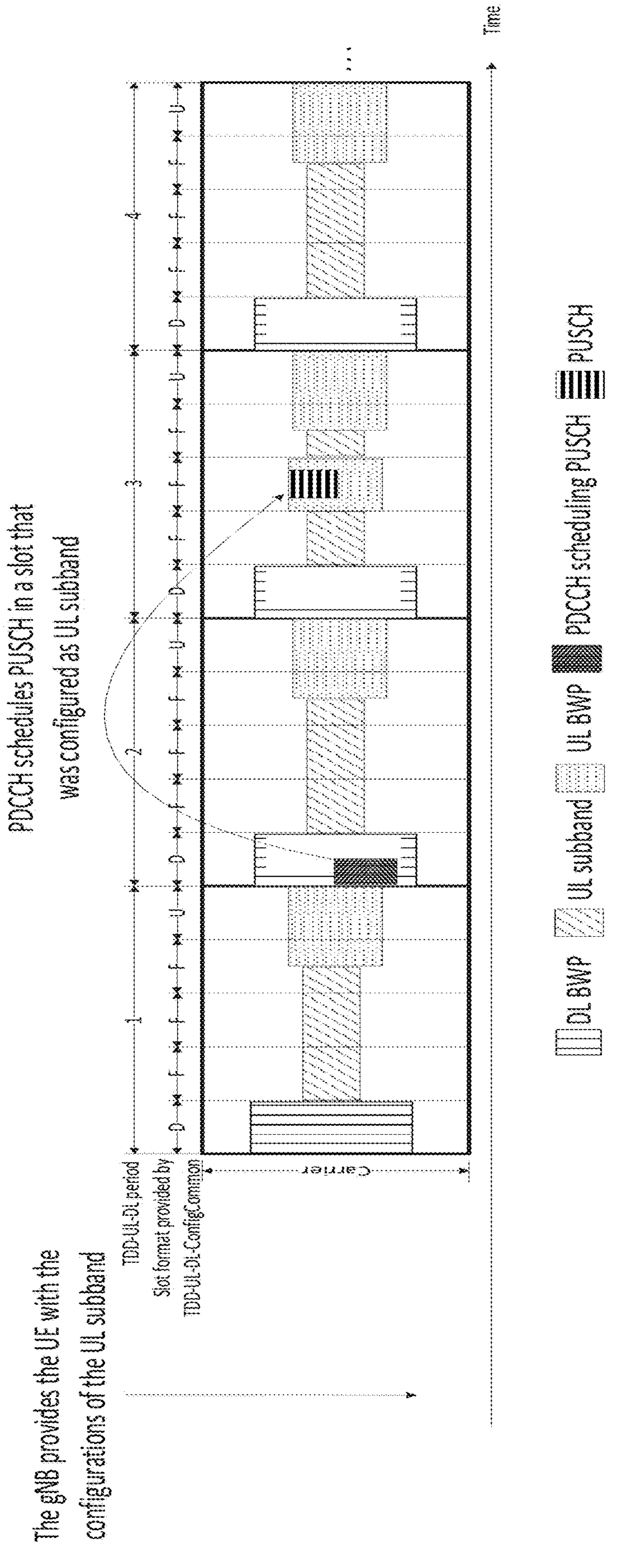
FIG. 8 is a resource grid illustrating using a dynamic grant indicating that an entire UL BWP is used for UL transmission, according to an embodiment.

FIG. 8 is a resource grid illustrating using a dynamic grant indicating that an entire UL BWP is used for UL transmission, according to an embodiment.

Referring to FIG. 8, the entire UL BWP is used for UL transmission, not only the UL subband when it is configured in "F" symbols. When a UE receives a dynamic PUSCH that spans RBs beyond the limits of the UL subband but remains within the confines of the UL BWP, it may determine that the entirety of the slot is available for UL transmission. This determination is based on the UL BWP associated with the UL subband. Similar to the aforementioned solution, the overriding of UL subband may occur in a set of symbols, slots, etc., surrounding the dynamic UL signal.

The timing may be similar to the timing described above with respect to explicit indicators to pinpoint the minimal temporal gap between the first or last symbol carrying the PDCCH, and the instance in which overriding may occur. Similar explicit indicator methodologies may also be used for the specific slot or subframe boundaries during which the PDCCH is transmitted, or the period of TDD-UL-DL in which the PDCCH transmission occurs, and the point in time when the configuration of the UL subband is potentially overridden.

When utilizing a dynamic grant as an indication that the complete UL BWP is purposed for UL transmissions, the UL subband may be integrated, especially when symbolically represented by "F" symbols. Semi-persistent scheduling (SPS) can be a potential mechanism for this implicit indication, operating in congruence with dynamic scheduling. In certain scenarios, if the DL SPS is activated in such a manner that a portion of the SPS occasions are transmitted in symbols containing or configured with the UL subband, the rules already established for dynamic PDSCH can be broadened to identify which cluster of RBs are eligible for DL reception.

In scenarios where a configured grant (CG) PUSCH is activated, the behavior noted for dynamic PUSCH may be used, depending on whether the UE transmits the PUSCH in the CG occasion. The SPS activated by MAC-CE, e.g., semi-persistent CSI-RS, may adhere to the same behavioral pattern as dynamic scheduling to determine if the UL subband configuration is overridden.

Accordingly, SPS may be used to delineate a specific pattern for overriding UL subband configurations. The decision of whether to override is often based on the periodicity of the SPS or the UL subband configuration. One such example can be seen when the DL SPS is synchronized with the periodicity equivalent to the TDD-UL-DL periodicity. Under these circumstances, the UL subband is consistently overridden during every DL SPS occasion within each TDD-UL-DL cycle, until the deactivation of the SPS. Similar to implicit overriding of the UL subband, the number of symbols, slots, etc., in which the UL subband configurations are overridden may be configured by higher layer signaling, predefined, or indicated via UE capability signaling.

Persistent scheduling, based on RRC configurations, can operate similarly to dynamic scheduling, with the capability to override subband configurations.

It may be useful for UE implementations to reduce ambiguities regarding potential overrides of any symbol designed for the UL subband. There can be certain slots designated for persistent use for the UL subband, immune to any override, whether explicit or implicit. Such a feature is useful when the UL subband is embedded with a configured-grant PUSCH, offering the UE the ability to strategize its UL transmissions. In instances of important UL transmissions, the UE might determine to transmit these UL transmissions during PUSCH occasions, specifically within symbols that are not easily overridden.

Additionally, mechanisms pointing out which symbols or slots of the UL subband can be overridden may be provided. If, for example, the UE is directed to receive a DL transmission within a slot that also indicates a potential override of the UL subband, the UE can preemptively anticipate interference from other concurrent UEs transmitting within the same UL subband.

To indicate which symbols are reserved or can be overwritten, a bitmap can be used which can depict which symbols including or configured with the UL subband can or cannot be overridden. This bitmap, transmitted to the UE via higher-layer signaling mechanisms like RRC, can adopt the same periodicity as the UL subband. For example, if the UL subband configuration is anchored to the TDD-UL-DL period, the bitmap aligns itself accordingly. The bitmap may indicate the symbols/slots/TDD-UL-DL period that can or cannot be overridden in a period and the same indication may be applied across different periods. The flexibility of the bitmap also allows it to be set with periodicities distinct from the UL subband configuration. In this case, the UE may ignore the bits corresponding to the symbols or slots used as regular DL or UL and not indicated as an UL subband. In situations where a bitmap is employed, each bit may be symbolic of single or multiple symbols, with the most significant bit representing the primary (or first) symbol in the TDD-UL-DL period or the period of the UL subband if it differs from the TDD-UL-DL period.

An alternative approach to indicate which symbols are reserved or can be overwritten involves the gNB communicating to the UE the specific duration during which the UL subband configurations can or cannot potentially be overridden. This duration can be delineated by specifying the starting point and the length of the period or the starting and ending points. This is similar to SLIV indications used for TDRA tables, where details like slot offset, symbol offset within the flagged slot, and the count of symbols are presented. This indicated duration may find repetition in every UL subband period, for example, during each TDD-UL-DL cycle.

The bitmap (or the indication of a specific duration) may be received by the UE as a separate signal than a UL subband configuration and may be used to indicate a location of reserved symbols and/or whether the reserved symbols may be overridden.

Another possible mechanism to indicate which symbols are reserved or can be overwritten relies on predetermined rules to discern which symbols within the UL subband are susceptible to being overridden. Here, a first or last "n" number of symbols, extracted from the set of symbols designed for a UL subband within the configured UL subband period (e.g., the TDD-UL-DL period), may be designated. The value of "n" can be determined by higher-layer signaling, such as RRC, or could be predetermined.

The gNB may provide the capability to convey to the UE whether to employ rate matching around the UL subband, especially when the DL transmission intersects, either partially or fully, with the UL subband. This can be used especially when implicit indications that toggle the transmission mode from operating within the UL subband to any of the scenarios described previously, providing information to the UE about the potential need for rate matching. This indication can be transmitted via a single-bit field that can be carried via higher layer signaling, MAC-CE, or DCI, dictating whether rate matching is necessary or not. In instances where rate matching is signaled and the DL transmission is scheduled or structured to coincide, either in part or wholly with the UL subband, the UE can deduce that rate matching is being used.

To enable the gNB to pinpoint which set of symbols can be used for DL reception, and which remain inaccessible for DL reception where rate matching is active, the earlier detailed procedures describing the reserved symbols can be used. For example, a bitmap can be employed to indicate which symbols are accessible for DL reception. When an implicit indication is used, the UE may refrain from rate matching around the UL subband. The specific symbols can be indicated either by specifying the exact duration or by using predefined rules.

Similar solutions may be applied for indicating to the UE whether or not CSI-RS should become non-contiguous in the frequency domain when it overlaps with the UL subband. Similarly, the aforementioned solutions may be easily extended to indicate whether or not the UE may assume that resource block group (RBG), precoding resource group (PRG), etc., is divided into two portions when it crosses the boundary between the UL subband and DL subband.

The UE can convey its ability to support previously discussed scenarios related to overriding UL subband configurations. This communication may include capability signaling, particularly when the UE is in the RRC connected state. The UE might communicate its ability to override UL subband configurations during instances when this subband is set in the "D" symbols configuration. Similar indications can be made for configurations set in "F" symbols, or in both configurations.

The UE may be able to provide more specific information to the gNB using the same capability signaling mechanism. For instance, based on the UL subband's specific symbols configuration (e.g., "D" or "F"), the UE can clarify which scenarios it can support. For example, for a UL subband set in the "F" symbols configuration, the UE might convey its ability to change the symbol to DL while excluding the RBs positioned within the UL subband, a scenario shown in (a) of FIG. 5. Additionally or alternatively, the UE may support changing the symbol to DL, a scenario shown in (b) of FIG. 5. Another scenario might involve converting the symbol to UL within the designated UL BWP, a scenario shown in (c) of FIG. 5. Moreover, the UE can provide its capability information in other ways as well.

On the other hand, when the UE operates in the RRC idle or inactive state, it may use PRACH resource selection mechanisms determined by variables like preamble identification (ID) and a random access channel (RACH) occasion. Through this channel, the UE may inform the gNB of its capabilities for overriding UL subband configurations when they are established in the "D" or "F" symbols. Similarly, through PRACH resource selection methods, the UE can identify which exact scenario it can support, similar to the configurations discussed earlier.

In addition, the UE can hint at its preference or support for specific signaling methods. For example, the possibility of the UE indicating its capability to discern between explicit and implicit indications, or its capacity to understand both types of indications simultaneously may be indicated. Furthermore, the UE can transmit to the gNB its compatibility with various transmission indications via PDCCH, MAC-CE, RRC, or any combination thereof.

When the UL subband is located on one side of the channel bandwidth, these indication processes can be used. That is, the methodologies formulated for scenarios where the UL subband sits at the channel bandwidth's center can be expanded to be used for this configuration.

In some scenarios, a certain set of symbols may be included or be configured to have a UL subband, while another distinct set may be used UL within the conventional UL BWP. Such configurations become particularly detailed when there's a UL transmission, in forms like PUCCH or PUSCH, that extend across symbols from both of these diverse sets. Under these circumstances, the expected behavior of the UE should be defined.

When the UL transmission encompasses both sets of symbols, as described above, this may be considered an "error" case. In this case, the UE would not anticipate or be predisposed to handle UL transmissions that seamlessly bridge both sets of symbols. This situation should be addressed in scenarios where the UE may have varying configurations meant for UL transmissions because discrepancies could emerge in UL beam parameters, power control parameters, and in the time advance value. This error case may only be applied for dynamic UL, e.g., PUSCH scheduled by PDCCH. On the other hand, for configured UL, e.g., CG PUSCH, periodic SRS, or repetitions of PUSCH after the first PUSCH even if they may be scheduled by DCI, the UE may not transmit such an UL signal or channel when it overlaps with both sets of symbols.

However, to provide a greater degree of flexibility for the gNB, the UL transmission may be configured to occupy a consistent set of RBs irrespective of the set of symbols it pertains to.

Figure 9:
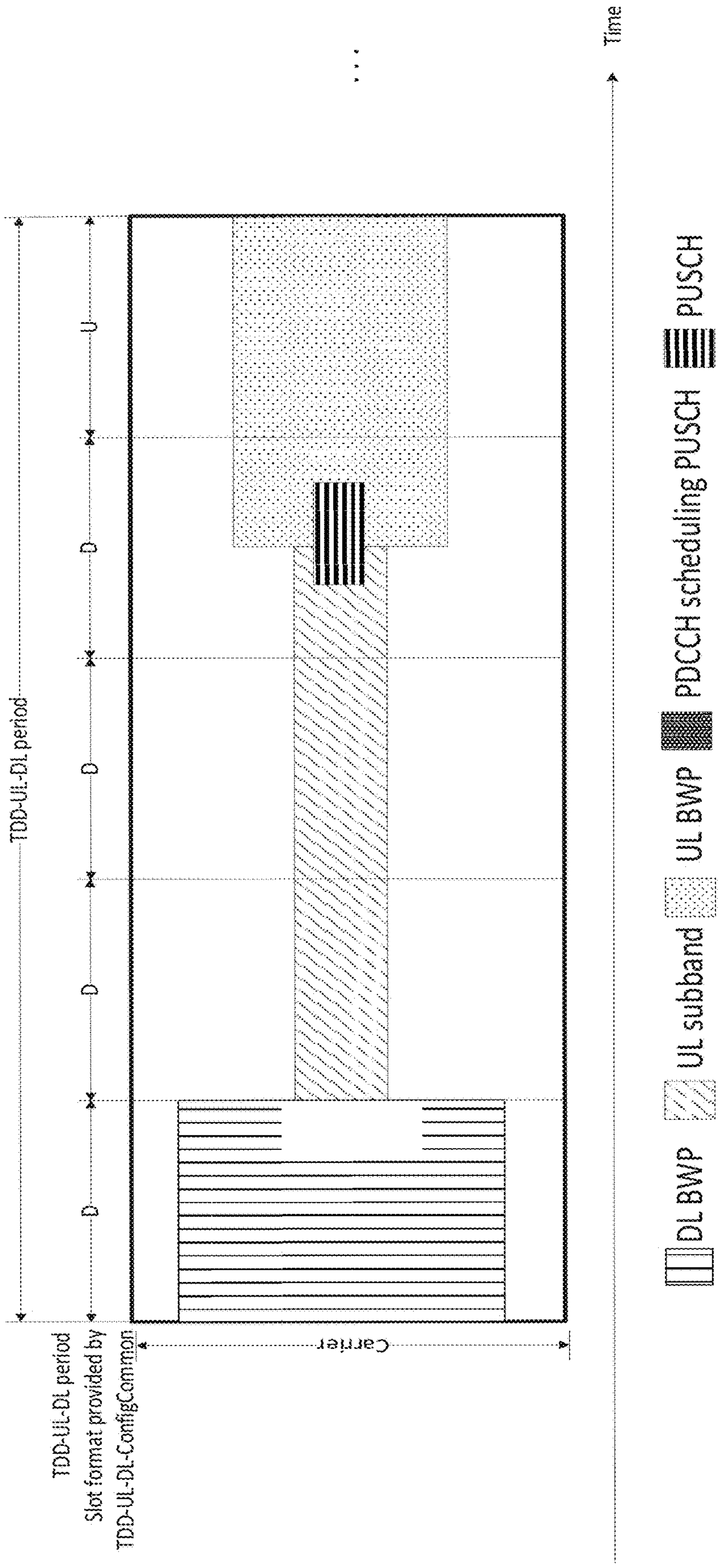
FIG. 9 is a resource grid illustrating a UL transmission that occupies a set of RBs across symbols configured as UL subband and symbols configured as regular UL BWP, according to an embodiment.

FIG. 9 is a resource grid illustrating a UL transmission that occupies a set of RBs across symbols configured as UL subband and symbols configured as regular UL BWP, according to an embodiment.

Referring to FIG. 9, while the allocation of frequency domain resources may depend on the UL subband's bandwidth, the UL transmission may occupy the same set of RBs across both sets of symbols. Thus, the UE may anticipate applying a uniform set of parameters for a UL transmission. These could include the UL beam parameters, power control parameters, and the time advance value, based on the UL subband configurations. In addition, the UL beam parameters, power control parameters, and time advance value may be based on the configuration specifics of the regular UL BWP.

In some scenarios, when the UL subband is included or configured in "F" symbols, and there's a concurrent UL transmission spanning both sets of symbols, the UE could infer that the UL subband has transitioned to the associated UL BWP. This assumption can be made irrespective of whether the UL transmission occupies RBs that are outside the scope of the UL subband. In situations where the UL transmission uses RBs outside the UL subband, there can be an implicit switchover, as described above.

Figure 10:
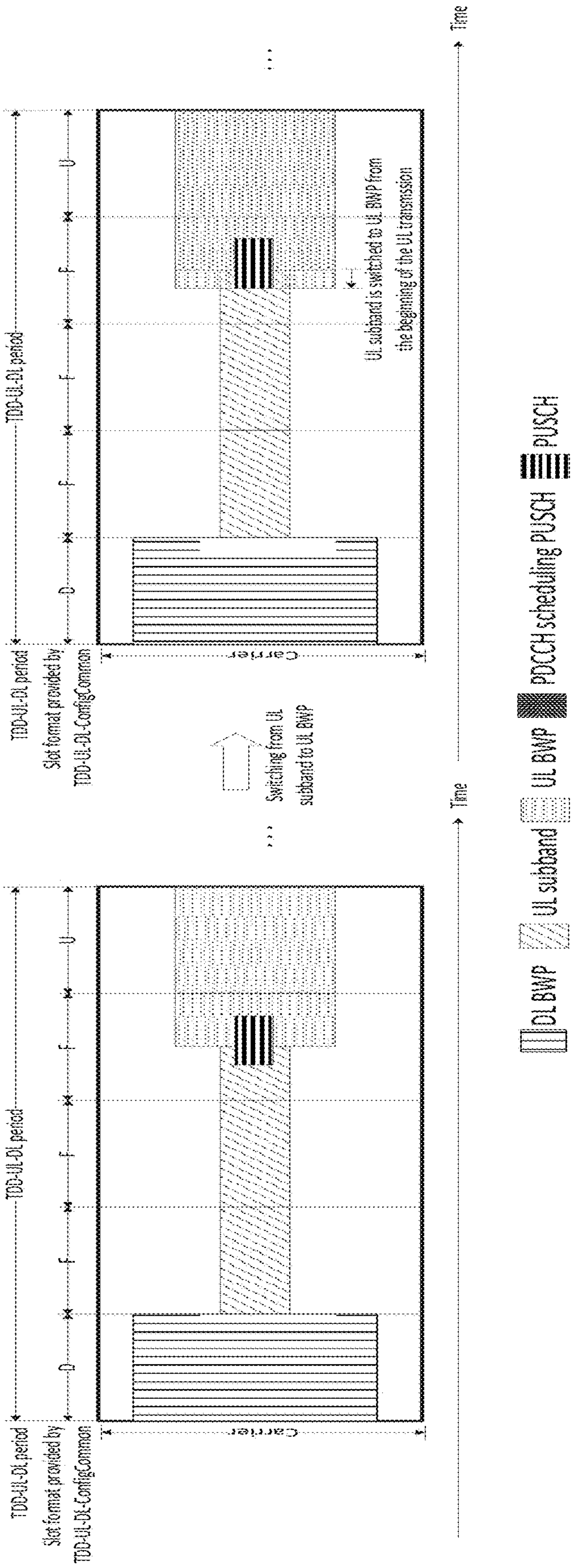
FIG. 10 is a resource grid illustrating switching from a UL subband operation to a regular UL BWP when a UL transmission occupies symbols configured as a UL subband and a regular UL BWP when the UL subband is configured in "F" symbols, according to an embodiment.

FIG. 10 is a resource grid illustrating switching from a UL subband operation to a regular UL BWP when a UL transmission occupies symbols configured as a UL subband and a regular UL BWP when the UL subband is configured in "F" symbols, according to an embodiment.

Referring to FIG. 10, the UL subband is shown as being configured with "F" symbols. Additionally, the PUSCH is set to span across multiple symbols. These symbols are configured for the UL subband as well as for other symbols set for the UL BWP. In this case, the UE may determine that there's a switch from the UL subband to the UL BWP although the PUSCH remains confined within the boundaries of the UL subband. Under these circumstances, the UE may utilize the UL beam parameters, the power control parameters, time advance value, and other related settings that are associated with the UL BWP rather than the UL subband.

Figure 11:
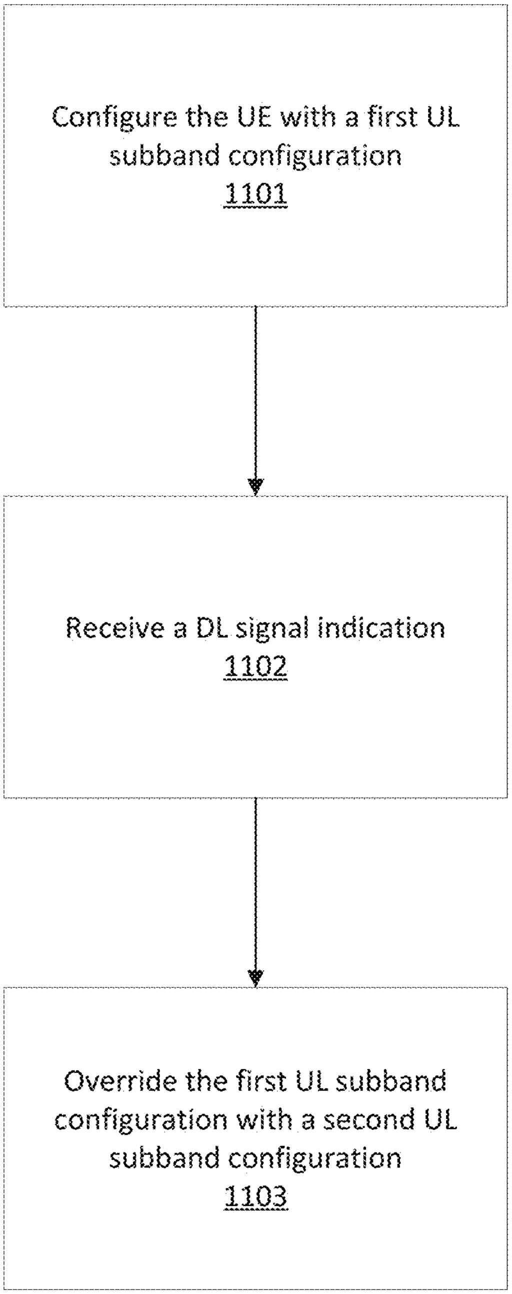
FIG. 11 is a flowchart illustrating a method for overriding UL subband configurations in a UE, according to an embodiment.

FIG. 11 is a flowchart illustrating a method for overriding UL subband configurations in a UE, according to an embodiment. Some or all of the steps shown in FIG. 11 may be performed by a transmitting or receiving device, such as that which is shown in FIG. 1.

Referring to FIG. 11, in step 1101, the UE is configured with a first UL subband configuration. The first UL subband configuration may be for communicating with an external device. The first UL subband configuration may designate a first RB inside of a subband for the UE to perform UL transmission.

In step 1102, the UE may receive a DL signal indication. The DL signal indication may be received in accordance with one or more of the aforementioned methods (e.g., RRC, L1 signaling, MAC CE, etc.).

In step 1103, the UE overrides the first UL subband configuration with a second UL subband configuration based on the DL signal indication. The second subband configuration may designate a first communication configuration of the first RB inside of the subband and a second communication configuration of a second RB outside of the subband.

Figure 12:
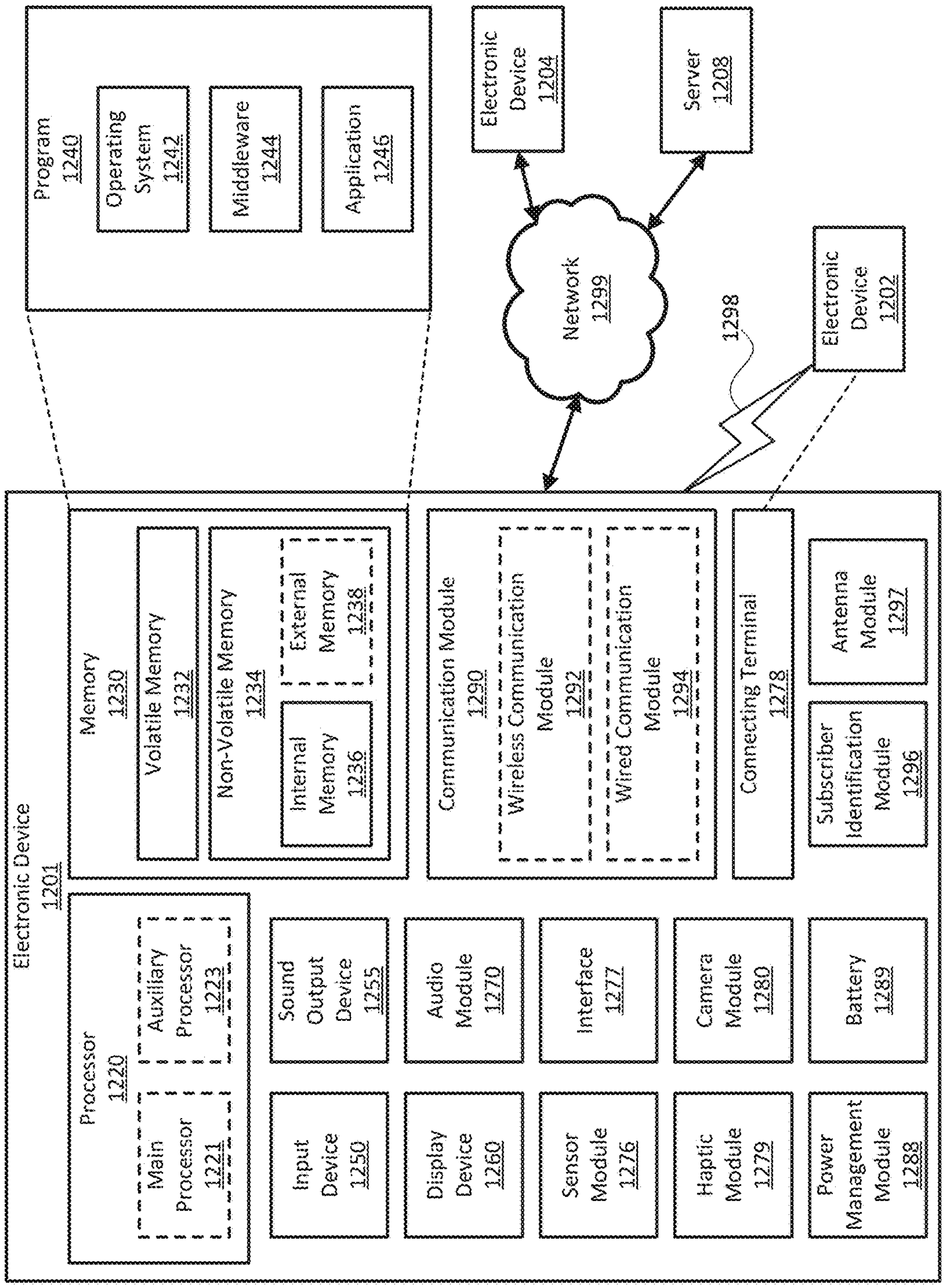
FIG. 12 is a block diagram of an electronic device in a network environment, according to an embodiment.

FIG. 12 is a block diagram of an electronic device in a network environment, according to an embodiment.

The electronic device described herein may be a transmitting device, receiving device, a UE and/or a BS. Furthermore, the electronic device may include the structural components and be included in a network environment described in the block diagram of FIG. 12.

Referring to FIG. 12, an electronic device 1201 in a network environment 1200 may communicate with an electronic device 1202 via a first network 1298 (e.g., a short-range wireless communication network), or an electronic device 1204 or a server 1208 via a second network 1299 (e.g., a long-range wireless communication network). The electronic device 1201 may communicate with the electronic device 1204 via the server 1208. The electronic device 1201 may include a processor 1220, a memory 1230, an input device 1250, a sound output device 1255, a display device 1260, an audio module 1270, a sensor module 1276, an interface 1277, a haptic module 1279, a camera module 1280, a power management module 1288, a battery 1289, a communication module 1290, a subscriber identification module (SIM) card 1296, or an antenna module 1297. In one embodiment, at least one (e.g., the display device 1260 or the camera module 1280) of the components may be omitted from the electronic device 1201, or one or more other components may be added to the electronic device 1201. Some of the components may be implemented as a single integrated circuit (IC). For example, the sensor module 1276 (e.g., a fingerprint sensor, an iris sensor, or an illuminance sensor) may be embedded in the display device 1260 (e.g., a display).

The processor 1220 may execute software (e.g., a program 1240) to control at least one other component (e.g., a hardware or a software component) of the electronic device 1201 coupled with the processor 1220 and may perform various data processing or computations.

As at least part of the data processing or computations, the processor 1220 may load a command or data received from another component (e.g., the sensor module 1276 or the communication module 1290) in volatile memory 1232, process the command or the data stored in the volatile memory 1232, and store resulting data in non-volatile memory 1234. The processor 1220 may include a main processor 1221 (e.g., a central processing unit (CPU) or an application processor (AP)), and an auxiliary processor 1223 (e.g., a graphics processing unit (GPU), an image signal processor (ISP), a sensor hub processor, or a communication processor (CP)) that is operable independently from, or in conjunction with, the main processor 1221. Additionally or alternatively, the auxiliary processor 1223 may be adapted to consume less power than the main processor 1221, or execute a particular function. The auxiliary processor 1223 may be implemented as being separate from, or a part of, the main processor 1221.

The auxiliary processor 1223 may control at least some of the functions or states related to at least one component (e.g., the display device 1260, the sensor module 1276, or the communication module 1290) among the components of the electronic device 1201, instead of the main processor 1221 while the main processor 1221 is in an inactive (e.g., sleep) state, or together with the main processor 1221 while the main processor 1221 is in an active state (e.g., executing an application). The auxiliary processor 1223 (e.g., an image signal processor or a communication processor) may be implemented as part of another component (e.g., the camera module 1280 or the communication module 1290) functionally related to the auxiliary processor 1223.

The memory 1230 may store various data used by at least one component (e.g., the processor 1220 or the sensor module 1276) of the electronic device 1201. The various data may include, for example, software (e.g., the program 1240) and input data or output data for a command related thereto. The memory 1230 may include the volatile memory 1232 or the non-volatile memory 1234. Non-volatile memory 1234 may include internal memory 1236 and/or external memory 1238.

The program 1240 may be stored in the memory 1230 as software, and may include, for example, an operating system (OS) 1242, middleware 1244, or an application 1246.

The input device 1250 may receive a command or data to be used by another component (e.g., the processor 1220) of the electronic device 1201, from the outside (e.g., a user) of the electronic device 1201. The input device 1250 may 1250 may include, for example, a microphone, a mouse, or a keyboard.

The sound output device 1255 may output sound signals to the outside of the electronic device 1201. The sound output device 1255 may include, for example, a speaker or a receiver. The speaker may be used for general purposes, such as playing multimedia or recording, and the receiver may be used for receiving an incoming call. The receiver may be implemented as being separate from, or a part of, the speaker.

The display device 1260 may visually provide information to the outside (e.g., a user) of the electronic device 1201. The display device 1260 may include, for example, a display, a hologram device, or a projector and control circuitry to control a corresponding one of the display, hologram device, and projector. The display device 1260 may include touch circuitry adapted to detect a touch, or sensor circuitry (e.g., a pressure sensor) adapted to measure the intensity of force incurred by the touch.

The audio module 1270 may convert a sound into an electrical signal and vice versa. The audio module 1270 may obtain the sound via the input device 1250 or output the sound via the sound output device 1255 or a headphone of an external electronic device 1202 directly (e.g., wired) or wirelessly coupled with the electronic device 1201.

The sensor module 1276 may detect an operational state (e.g., power or temperature) of the electronic device 1201 or an environmental state (e.g., a state of a user) external to the electronic device 1201, and then generate an electrical signal or data value corresponding to the detected state. The sensor module 1276 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 1277 may support one or more specified protocols to be used for the electronic device 1201 to be coupled with the external electronic device 1202 directly (e.g., wired) or wirelessly. The interface 1277 may include, for example, a high-definition multimedia interface (HDMI), a universal serial bus (USB) interface, a secure digital (SD) card interface, or an audio interface.

A connecting terminal 1278 may include a connector via which the electronic device 1201 may be physically connected with the external electronic device 1202. The connecting terminal 1278 may include, for example, an HDMI connector, a USB connector, an SD card connector, or an audio connector (e.g., a headphone connector).

The haptic module 1279 may convert an electrical signal into a mechanical stimulus (e.g., a vibration or a movement) or an electrical stimulus which may be recognized by a user via tactile sensation or kinesthetic sensation. The haptic module 1279 may include, for example, a motor, a piezoelectric element, or an electrical stimulator.

The camera module 1280 may capture a still image or moving images. The camera module 1280 may include one or more lenses, image sensors, image signal processors, or flashes. The power management module 1288 may manage power supplied to the electronic device 1201. The power management module 1288 may 1288 may be implemented as at least part of, for example, a power management integrated circuit (PMIC).

The battery 1289 may supply power to at least one component of the electronic device 1201. The battery 1289 may include, for example, a primary cell which is not rechargeable, a secondary cell which is rechargeable, or a fuel cell.

The communication module 1290 may support establishing a direct (e.g., wired) communication channel or a wireless communication channel between the electronic device 1201 and the external electronic device (e.g., the electronic device 1202, the electronic device 1204, or the server 1208) and performing communication via the established communication channel. The communication module 1290 may include one or more communication processors that are operable independently from the processor 1220 (e.g., the AP) and supports a direct (e.g., wired) communication or a wireless communication. The communication module 1290 may include a wireless communication module 1292 (e.g., a cellular communication module, a short-range wireless communication module, or a global navigation satellite system (GNSS) communication module) or a wired communication module 1294 (e.g., a local area network (LAN) communication module or a power line communication (PLC) module). A corresponding one of these communication modules may communicate with the external electronic device via the first network 1298 (e.g., a short-range communication network, such as BLUETOOTH™, wireless-fidelity (Wi-Fi) direct, or a standard of the Infrared Data Association (IrDA)) or the second network 1299 (e.g., a long-range communication network, such as a cellular network, the Internet, or a computer network (e.g., LAN or wide area network (WAN)). These various types of communication modules may be implemented as a single component (e.g., a single IC), or may be implemented as multiple components (e.g., multiple ICs) that are separate from each other. The wireless communication module 1292 may identify and authenticate the electronic device 1201 in a communication network, such as the first network 1298 or the second network 1299, using subscriber information (e.g., international mobile subscriber identity (IMSI)) stored in the subscriber identification module 1296.

The antenna module 1297 may transmit or receive a signal or power to or from the outside (e.g., the external electronic device) of the electronic device 1201. The antenna module 1297 may include one or more antennas, and, therefrom, at least one antenna appropriate for a communication scheme used in the communication network, such as the first network 1298 or the second network 1299, may be selected, for example, by the communication module 1290 (e.g., the wireless communication module 1292). The signal or the power may then be transmitted or received between the communication module 1290 and the external electronic device via the selected at least one antenna.

Commands or data may be transmitted or received between the electronic device 1201 and the external electronic device 1204 via the server 1208 coupled with the second network 1299. Each of the electronic devices 1202 and 1204 may be a device of a same type as, or a different type, from the electronic device 1201. All or some of operations to be executed at the electronic device 1201 may be executed at one or more of the external electronic devices 1202, 1204, or 1208. For example, if the electronic device 1201 should perform a function or a service automatically, or in response to a request from a user or another device, the electronic device 1201, instead of, or in addition to, executing the function or the service, may request the one or more external electronic devices to perform at least part of the function or the service. The one or more external electronic devices receiving the request may perform the at least part of the function or the service requested, or an additional function or an additional service related to the request and transfer an outcome of the performing to the electronic device 1201. The electronic device 1201 may provide the outcome, with or without further processing of the outcome, as at least part of a reply to the request. To that end, a cloud computing, distributed computing, or client-server computing technology may be used, for example.

Figure 13:
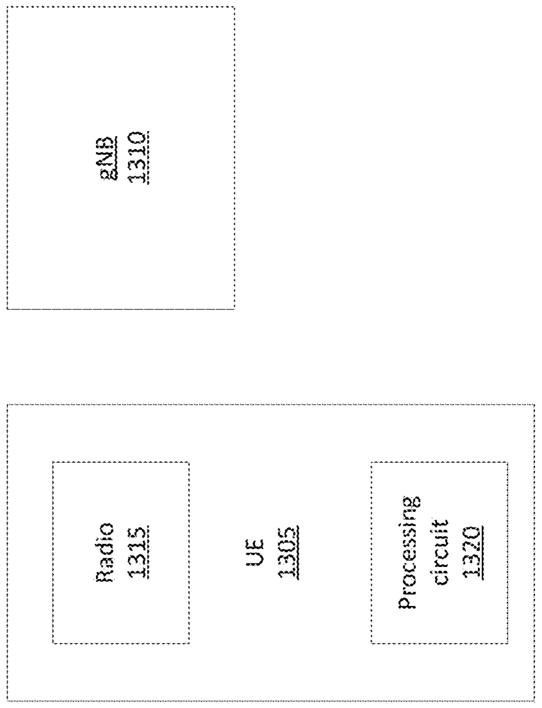
FIG. 13 is a system including a UE and a base station (gNB), in communication with each other, according to an embodiment.

FIG. 13 illustrates a system including a UE and a gNB, in communication with each other, according to an embodiment.

Referring to FIG. 13, the UE 1305 may include a radio 1315 and a processing circuit (or a means for processing) 1320, which may perform various methods disclosed herein. For example, the processing circuit 1320 may receive, via the radio 1315, transmissions from the gNB 1310, and the processing circuit 1320 may transmit, via the radio 1315, signals to the gNB 1310.

Embodiments of the subject matter and the operations described in this specification may be implemented in digital electronic circuitry, or in computer software, firmware, or hardware, including the structures disclosed in this specification and their structural equivalents, or in combinations of one or more of them. Embodiments of the subject matter described in this specification may be implemented as one or more computer programs, i.e., one or more modules of computer-program instructions, encoded on computer-storage medium for execution by, or to control the operation of data-processing apparatus. Alternatively or additionally, the program instructions can be encoded on an artificially-generated propagated signal, e.g., a machine-generated electrical, optical, or electromagnetic signal, which is generated to encode information for transmission to suitable receiver apparatus for execution by a data processing apparatus. A computer-storage medium can be, or be included in, a computer-readable storage device, a computer-readable storage substrate, a random or serial-access memory array or device, or a combination thereof. Moreover, while a computer-storage medium is not a propagated signal, a computer-storage medium may be a source or destination of computer-program instructions encoded in an artificially-generated propagated signal. The computer-storage medium can also be, or be included in, one or more separate physical components or media (e.g., multiple CDs, disks, or other storage devices). Additionally, the operations described in this specification may be implemented as operations performed by a data-processing apparatus on data stored on one or more computer-readable storage devices or received from other sources.

While this specification may contain many specific implementation details, the implementation details should not be construed as limitations on the scope of any claimed subject matter, but rather be construed as descriptions of features specific to particular embodiments. Certain features that are described in this specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described herein. Other embodiments are within the scope of the following claims. In some cases, the actions set forth in the claims may be performed in a different order and still achieve desirable results. Additionally, the processes depicted in the accompanying figures do not necessarily require the particular order shown, or sequential order, to achieve desirable results. In certain implementations, multitasking and parallel processing may be advantageous.

As will be recognized by those skilled in the art, the innovative concepts described herein may be modified and varied over a wide range of applications. Accordingly, the scope of claimed subject matter should not be limited to any of the specific exemplary teachings discussed above, but is instead defined by the following claims.

What is claimed is:

1. A method for overriding uplink (UL) subband configurations in a (UE), the method comprising:

configuring the UE with a first UL subband configuration for communicating with an external device, wherein the first UL subband configuration designates a first set of one or more resource blocks (RBs) inside of a carrier for the UE to perform UL transmission, receiving a downlink (DL) signal indication providing information indicating an overriding duration, and overriding the first UL subband configuration with a second subband configuration based on the DL signal indication, wherein the second subband configuration designates a first communication configuration of the first set of one or more RBs inside of a subband and a second communication configuration of a second set of RBs outside of the subband.

2. The method of claim 1, wherein the second communication configuration designates the second set of one or more RBs outside of the subband to exclusively permit DL reception.

3. The method of claim 1, wherein the first communication configuration and the second communication configuration designate all RBs included in the first and second set of RBs to permit DL reception.

4. The method of claim 1, wherein the first communication configuration and the second communication configuration designate all RBs included in the first and second set of RBs to permit UL transmission.

5. The method of claim 1, wherein the DL signal indication is explicit and carried by downlink control information (DCI), medium access control-control element (MAC-CE), or radio resource control (RRC).

6. The method of claim 1, wherein the DL signal indication is implicit and carried by scheduling downlink control information (DCI).

7. The method of claim 1, further comprising receiving information, from an external device indicating a location of reserved symbols and whether the reserved symbols may be overridden.

8. The method of claim 1, further comprising determining a minimum time offset between reception of the DL signal indication and when overriding the first UL subband configuration with the second subband configuration occurs.

9. The method of claim 1, wherein a UL transmission of the UE spans one or more RBs across a plurality of symbols.

10. A user equipment (UE), comprising:

a memory device, and a processor configured to execute instructions stored on the memory device, wherein the instructions cause the processor to:

configure the UE with a first UL subband configuration for communicating with an external device, wherein the first UL subband configuration designates a first set of one or more resource blocks (RBs) inside of a carrier for the UE to perform UL transmission, receive a downlink (DL) signal indication providing information indicating an overriding duration, and override the first UL subband configuration with a second subband configuration based on the DL signal indication, wherein the second subband configuration designates a first communication configuration of the first set of one or more RBs inside of the subband and a second communication configuration of a second of one or more RBs outside of the subband.

11. The UE of claim 10, wherein the second communication configuration designates the second set of one or more RBs outside of the subband to exclusively permit DL reception.

12. The UE of claim 10, wherein the first communication configuration and the second communication configuration designate all RBs included in the first and second set of RBs to permit DL reception.

13. The UE of claim 10, wherein the first communication configuration and the second communication configuration designate all RBs included in the first and second set of RBs to permit UL transmission.

14. The UE of claim 10, wherein the DL signal indication is explicit and carried by downlink control information (DCI), medium access control-control element (MAC-CE), or radio resource control (RRC).

15. The UE of claim 10, wherein the DL signal indication is implicit and carried by scheduling downlink control information (DCI).

16. The UE of claim 10, wherein the instructions further cause the processor to:

receive information, from an external device, indicating a location of reserved symbols and whether the reserved symbols may be overridden.

17. The UE of claim 10, wherein the instructions further cause the processor to:

determine a minimum time offset between reception of the DL signal indication and when overriding the first UL subband configuration with the second subband configuration occurs.

18. The UE of claim 10, wherein a UL transmission of the UE spans one or more RBs across a plurality of symbols.

* * * * *